Oct. 25, 1960
F. E. PARKE
2,957,569
MAGNETIC CONVEYORS
Filed Feb. 3, 1959
3 Sheets-Sheet 1
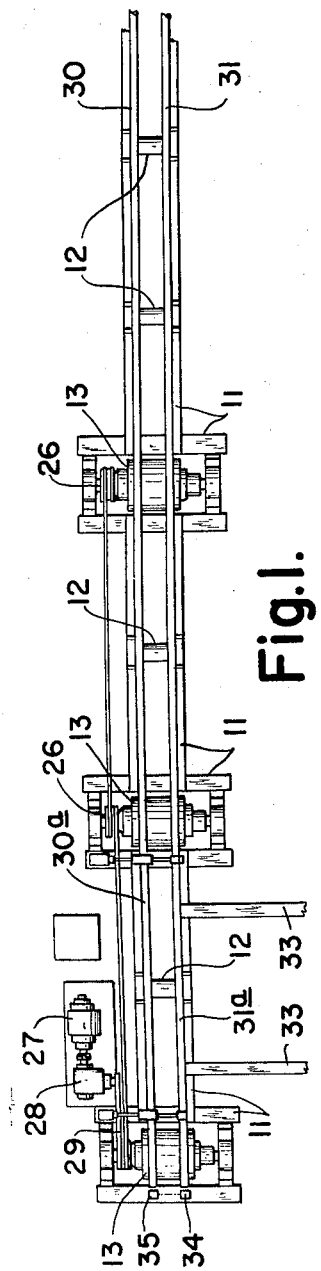
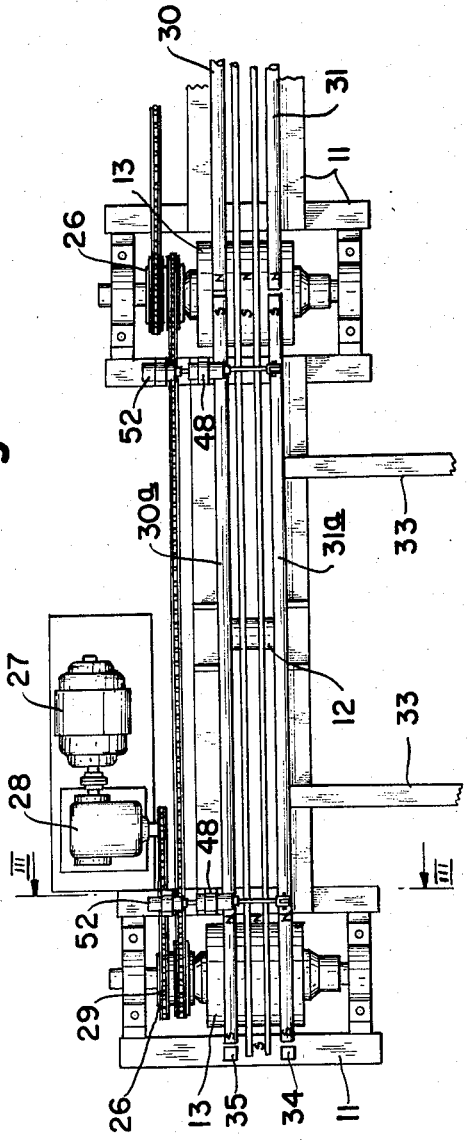
INVENTOR.
Franklin E. Parke
ATTORNEY.

Oct. 25, 1960     F. E. PARKE     2,957,569
MAGNETIC CONVEYORS
Filed Feb. 3, 1959     3 Sheets-Sheet 2
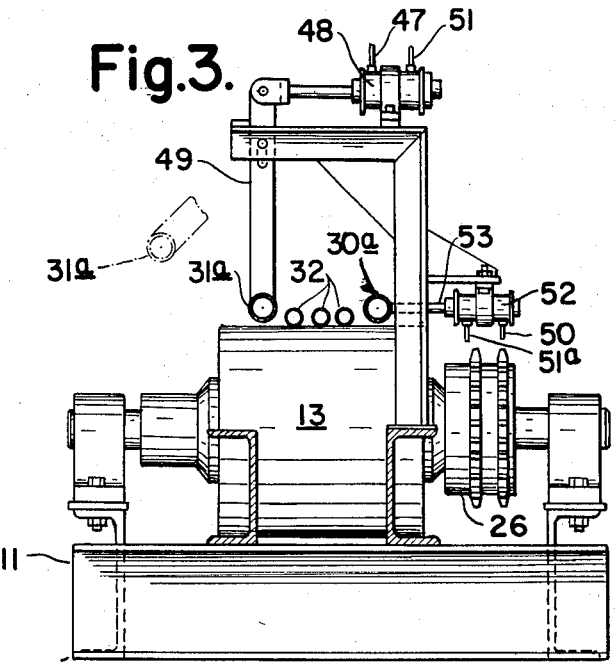
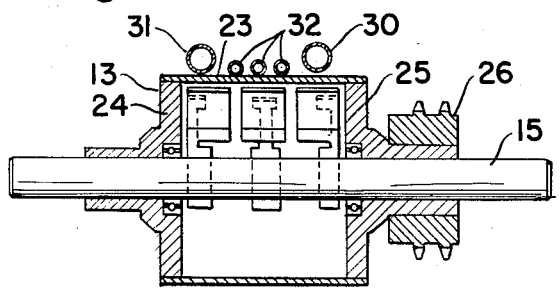
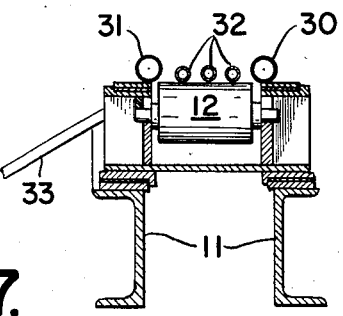
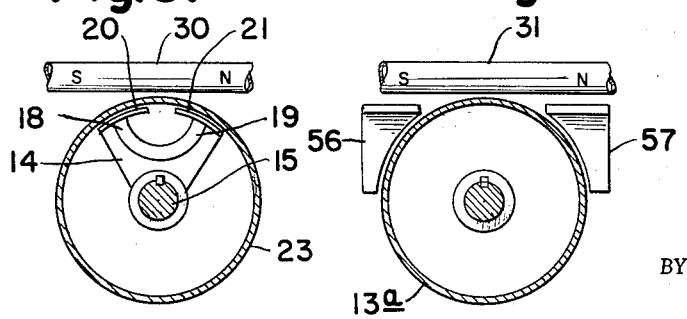
INVENTOR.
Franklin E. Parke
BY *Archwold Martin*
ATTORNEY.

Oct. 25, 1960   F. E. PARKE   2,957,569
MAGNETIC CONVEYORS
Filed Feb. 3, 1959   3 Sheets-Sheet 3

INVENTOR.
Franklin E. Parke
BY Archwork Martin

ATTORNEY.

United States Patent Office 2,957,569
Patented Oct. 25, 1960

2,957,569

MAGNETIC CONVEYORS

Franklin E. Parke, 1121 Empire Bldg., Pittsburgh, Pa.

Filed Feb. 3, 1959, Ser. No. 790,936

11 Claims. (Cl. 198—24)

This invention relates to conveyors of the type especially designed for carrying or moving magnetizable articles, and more particularly articles of ferro-magnetic material such as tubes, pipes, rods and other articles of substantial length.

One object of my invention is to discharge magnetizable articles from a conveyor of the type referred to, by the use of a repellant magnetic force supplied either by permanent magnets or by electro-magnetic energy from a generator, thereby avoiding engagement of pushers or guides directly with the articles and thus preventing damage to the articles, or scarring the "finish" on coated articles, etc.

Another object of my invention is to provide an improved means of conveying and discharging articles by the use of magnetically repellant forces, in desired predetermined spaced relation.

Still another object of my invention is to provide means for maintaining articles on a traveling conveyor belt or on rollers, by magnetic forces and to discharge the articles therefrom by a repellant magnetic force at a discharge station, that will overcome the first-named forces.

Figure 1 is a plan view of a portion of a conveyor with which my invention is employed.

Fig. 2 is an enlarged plan view of the discharge end of the structure of Fig. 1.

Fig. 3 is an enlarged sectional view taken on the line III—III of Fig. 2.

Fig. 4 is a sectional view through one of the driven conveyor rolls of Fig. 1, partly broken away to show permanent magnets therein.

Fig. 5 is a cross sectional view of the structure of Fig. 4.

Fig. 6 is a cross sectional view showing one of the idler rollers of Fig. 1.

Fig. 7 shows a modification of the roller and magnet arrangement of Fig. 5.

Figure 8:
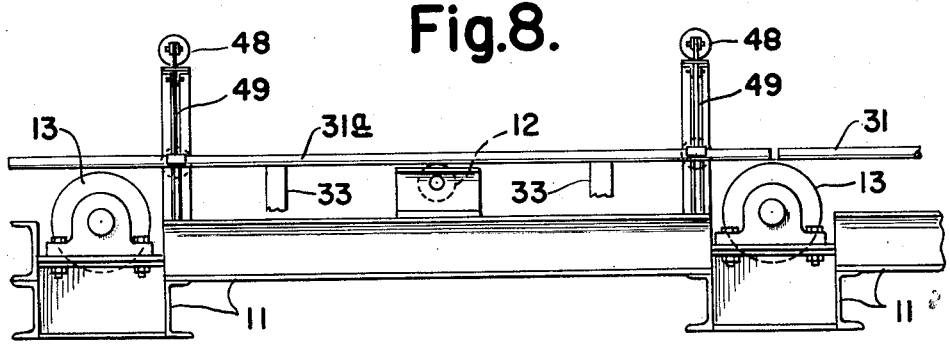
Fig. 8 is an elevational view of the structure of Fig. 1, on an enlarged scale, at the discharge end thereof.

As shown more clearly in Figs. 1 to 6, the apparatus comprises a supporting framework 11 for the conveyor parts. Idler rollers 12 are journaled in the framework as shown more clearly in Fig. 6 and live rollers 13 are also journaled in the framework, these live rollers as shown in Fig. 4, serving as housings for permanent magnets 14 (Figs. 4 and 5) that are rigidly mounted on stationary shafts 15. The magnets 14 are approximately U-shaped and have their south poles 18 in transverse alinement and their north poles 19 in transverse alinement, and symmetrically located with respect to the upper end of the vertical center line of the roller 13. In order to increase the effectiveness with which the magnets induce magnetism in side guides to be hereinafter described, I connect the transversely-alined magnets 18, also the magnets 19 by pole pieces 20 and 21 respectively. These extend across the north and south poles respectively of the magnets and are curved complementarily to the interior of a roller shell or drum 23 which is secured to hubs 24 and 25 that are rotatable on the shaft 15 and are driven by a sprocket wheel 26 to which they are keyed, from a motor 27 through a gear reducer 28 and a sprocket chain drive 29.

Side guides 30 and 31 are supported on the framework 11 just above actual engagement with the shells 23 of the live rollers 13. The side guides 30—31 extend from end-to-end of the conveyor, although at the discharge station, they are divided into sections, the front sections 30a and 31a being shiftable laterally as hereinafter explained. In any case, the side guides each have north polarity induced therein by the magnets 19 and a south polarity by the magnets 18, at each roller 13, whereby there is a repellant magnetic effect as between the side guides and pipes 32 or other ferro-magnetic articles moved by the conveyor, and between poles in each of the pipes 32, as appears more clearly in Fig. 2.

This magnetic force will hold the pipes laterally spaced apart in predetermined spaced relation. This is an advantage, in that the conveyor may be utilized to carry pipes past a spray-coating head and the pipes therefore can be exposed on all circumferential areas to the spraying material. The pipes or other articles will be placed upon the conveyor rolls at the rear end of the conveyor and moved forwardly by the live rollers to the discharge end of the conveyor, at the left-hand of Figs. 1 and 2, where they will be discharged by magnetic force as hereinafter explained.

At the discharge end of the conveyor, skids 33 are provided where pipes or rods are to be discharged from the conveyor. In the case of short or small articles, chutes can be provided. The pipes or other articles will be discharged to drying racks, threading machines, machine tools, assembly lines, etc., where it is desired to keep them in accurately spaced relation, out of contact with one another, which contact might interfere with proper timing, or damage the finish on the articles.

Figure 10:
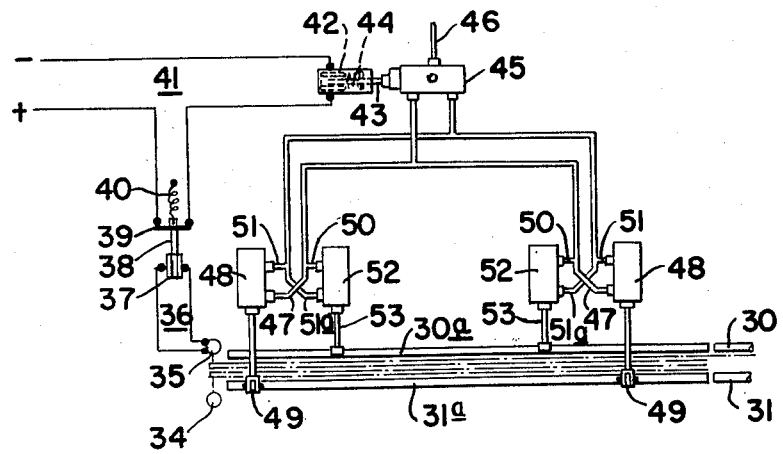
Fig. 10 is a diagrammatic view showing the control apparatus for effecting a discharge of articles from the conveyor, at the forward end thereof.

In order to effect discharge of the articles, the side guide members 30a and 31b are movable transversely of the path of travel of the material. To effect this purpose, the leading ends of the articles will intercept a beam of light between a lamp 34 and a photo-electric cell 35 (Fig. 10), which breaks current flow in a low voltage circuit 36 that includes a magnet coil 37. This releases a magnet core 38 to effect closure of a relay switch 39 under the pull of a spring 40. The closure of the relay switch completes a circuit through a higher voltage circuit 41 that includes an electro-magnet 42. Upon energization of this electro-magnet, its core member 43 is pulled against a spring 44, to shift a valve 45 in a direction to set up fluid pressure flow from a line 46 through pipes 47 and 51 that enter the inner ends of cylinders 48, which will result in moving their pistons to the right as viewed in Fig. 3, to thereby rock a lever 49 at each end of the guide 31a, to swing this guide member clear of the conveyor and out of the influence of the magnets contained within the rollers 13.

This same movement of the control valve 45 admits pressure through pipes 47 and 50 to the outer ends of the cylinders 52 to move their piston rods 53 in a left-hand direction as shown in Fig. 3, thus shifting the guide 30a toward skids 33. The repellant magnetic force existing between the guide 30a and the pipes 32 will cause such pipes to be moved from the rollers 12 and 13 to the skid rails 33 in approximately the same relatively spaced relation as they occupied on the conveyor rolls.

When the article has been discharged from between the members 34 and 35, reestablishment of the light beam is effected and the circuit in line 36 and the magnet 37 will be energized to open the relay switch at 39. This releases the core of the magnet 42 and allows the spring 44 to shift the valve 45 in a direction to effect application of pressure through the lines 51, to the outer ends of the cylinders 48, thereby causing the fluid pressure to swing the levers 49 in a counter-clockwise direction and restore the side guide 31a to its operative position of Fig. 3. Exhaust at this time will occur through the lines 47 and the valve 45. Contrarywise when pressure is admitted through the lines 47 to the cylinders, the exhaust will be through lines 50.

This shifting of the control valve 45 also results in pressure from the lines 51 entering the inner ends of the cylinders 52 through pipes 51a thus drawing the piston rods 53 backwardly and restoring the guide 30a to the position shown in Fig. 3.

Referring now to Fig. 7, I show a modification wherein permanent magnets 56 and 57 correspond to the magnets 18 and 19, respectively, they being connected crosswise of the conveyor as are the magnets of Fig. 4. While these magnets are not contained within the live rollers 13a, they will nevertheless produce the same repellant effects in the guides and the pipes.

Figure 9:
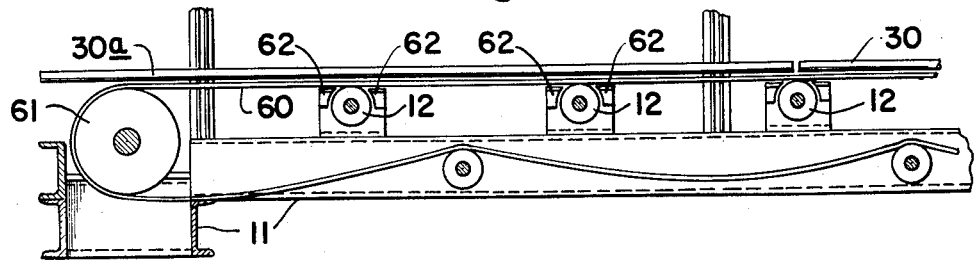
Fig. 9 shows a modification of the structure of Fig. 8, wherein a conveyor belt is substituted for the live rollers 8.

In Fig. 9, I show a belt-type conveyor wherein a looped belt 60 is driven by a pulley 61. In this case, magnets 62 that function similarly to 18 and 19 can be arranged either interiorly of or closely adjacent to the rollers that support the upper run of the belt.

It will be understood that pipes or other articles can be carried on a conveyor arranged as a single row in longitudinally-spaced relation, instead of having a plurality of them placed side-by-side as indicated in Figs. 4 and 6 of the drawings. In either case, the articles will be discharged from the conveyor by the repellant force, without impingement against them of a mechanical pusher or guide.

If electrically-energized magnets are employed, a greater repellant force can be had than with permanent magnets.

The articles can be of much shorter length than ordinary pipes and rods, in that they need be only of a length to approximately bridge the magnetic gap between each pair of north and south poles.

Articles that are arranged in a single row longitudinally of the conveyor will remain thereon, within the magnetic fields of the magnets of Figs. 4, 5, 7 or 9 while traveling to the discharge station. Under such an arrangement, side guides are not needed. At the discharge station, a magnetic member such as a side guide of ferromagnetic material, that corresponds to 30a, can be utilized to exert a repellant force that will discharge the articles sidewise from the magnetic field and from the conveyor. The guide 31a in that case will be omitted or held in its inoperative position and the guide 30a will be moved from a position spaced some distance outwardly from the edge of the conveyor, inwardly past the position shown in Fig. 2, thereby exerting a repellant effect that will discharge articles one-by-one, since it will be actuated by its pistons each time the front end of an article reaches the light beam at the electric eye.

I claim as my invention:

1. Conveying apparatus for elongated ferro-magnetic articles, comprising a conveyor device for moving the articles along a path that is parallel to their axes, side guides of ferro-magnetic material extending longitudinally along the conveyor, at opposite sides thereof, magnets positioned to induce magnetism of one polarity in the guides and the articles at certain transverse zones and inducing magnetism of the opposite polarity in the guides and the articles at other transverse zones, each of which is adjacent to one of the first-named zones, to thereby provide mutually repellant magnetic fields in the guides and the articles, at said zones, the side guide at each side of the conveyor being made in longitudinally-alined and transversely-movable sections at the discharge end of the conveyor, one of which sections is movable away from the conveyor such distance that the repellant field at said one section is rendered ineffective to such degree that the repellant field in the other guide and the articles will effect sidewise discharge of the articles from the conveyor, when the opposite guide section is moved inwardly toward the center line of the conveyor.

2. Apparatus as recited in claim 1, wherein the foremost guide section at said one side is automatically moved to its inoperative position and the opposite guide section moved inwardly, when a pipe, rod or similar elongated article comes between them, and means for automatically returning the guide sections to their initial positions after discharge of the article.

3. Apparatus as recited in claim 1, wherein the north poles of permanent magnets are placed in alinement transversely of the conveyor and connected by pole pieces, and the south poles of the magnets are alined transversely of the conveyor and are connected to one another by pole pieces, at the various zones.

4. A structure as recited in claim 3, wherein the conveyor mechanism includes rollers and the said north poles are respectively disposed at one side of each of a plurality of conveyor rollers and the south poles at the other side thereof.

5. A structure as recited in claim 3, wherein the conveyor mechanism includes rollers and each transverse row of north poles are contained within a roll that also contains one of the rows of south poles.

6. A structure as recited in claim 3, wherein a looped conveyor belt is interposed between the articles and the rollers.

7. Apparatus as recited in claim 1, wherein the guides at both sides are made in longitudinally-alined sections and an electrically-controlled device is actuated by each article as it reaches the discharge station for the conveyor, between two opposite guide sections, to move the said sections transversely of the conveyor such distance that one side section is shifted beyond the field of the magnets as to render it ineffective and the opposite guide is moved across the conveyor to effect sidewise discharge of articles therefrom, and means for automatically returning the said movable sections to their initial positions when an article has been discharged.

8. Apparatus as recited in claim 1, wherein the side guides at both sides of the conveyor are in sections and an electrically-controlled device is actuated by each article as it reaches the discharge station for the conveyor between two opposite guide sections, to move the said sections transversely of the conveyor such distance that one of the sections is moved past the adjacent side of the conveyor to a zone largely beyond the magnetic field of the north and south poles and the other side guide is maintained in the magnetic field during its movement, to thereby continue a magnetic repellant force against the article.

9. The method which comprises advancing articles of ferro-magnetic material along a given path by a conveyor, to a discharge station, maintaining the articles in said path by subjecting them to magnetic fields that restrain them from displacement sidewise from the conveyor while traveling to the discharge station, and applying a repellant magnetic force exerted from one side of the conveyor, at the discharge station, to thereby effect discharge movement of the articles toward and from the other side of the conveyor.

10. A method as recited in claim 8, wherein a plurality of articles are conveyed in side-by-side relation and the magnetic fields are such as to set up relatively magnetic repellant forces between the articles.

11. The method which comprises advancing articles of ferro-magnetic material along a given path by a conveyor to a discharge station, the articles being in a single row aligned longitudinally of the said path, subjecting said articles to magnetic fields that maintain them on a conveyor while traveling to the station, and applying a repellant magnetic force exerted from one side of the conveyor at the discharge station, to each article as it reaches said station, the force being sufficient to effect discharge of the articles from the other side of the conveyor.

References Cited in the file of this patent

UNITED STATES PATENTS 1,780,493    McKee _____ Nov. 4, 1930